United States Patent
Avraham et al.

(10) Patent No.: US 11,726,911 B2
(45) Date of Patent: Aug. 15, 2023

(54) NVME PERSISTENT MEMORY REGION QUICK COPY

(71) Applicant: Western Digital Technologies, Inc., San Jose, CA (US)

(72) Inventors: Dudy David Avraham, Even Yehuda (IL); Ran Zamir, Ramat Gan (IL)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/185,792

(22) Filed: Feb. 25, 2021

(65) Prior Publication Data

US 2022/0237118 A1 Jul. 28, 2022

Related U.S. Application Data

(60) Provisional application No. 63/141,211, filed on Jan. 25, 2021.

(51) Int. Cl.
*G06F 12/0804* (2016.01)
*G06F 11/10* (2006.01)

(52) U.S. Cl.
CPC ...... *G06F 12/0804* (2013.01); *G06F 11/1004* (2013.01); *G06F 2212/1032* (2013.01)

(58) Field of Classification Search
CPC ............ G06F 12/0804; G06F 11/1004; G06F 2212/1032
See application file for complete search history.

(56) References Cited

U.S. PATENT DOCUMENTS

| | | | |
|---|---|---|---|
| 7,830,732 B2 | 11/2010 | Moshayedi et al. | |
| 9,058,288 B2 | 6/2015 | Golov et al. | |
| 9,305,610 B2 | 4/2016 | Smith et al. | |
| 10,678,443 B2 | 6/2020 | Li et al. | |
| 2001/0023496 A1* | 9/2001 | Yamamoto | G06F 11/1076 714/763 |
| 2010/0202239 A1* | 8/2010 | Moshayedi | G11C 5/04 365/228 |
| 2016/0070507 A1* | 3/2016 | Hoshikawa | G06F 11/10 711/149 |
| 2017/0185615 A1* | 6/2017 | Wang | G06F 16/182 |
| 2018/0143877 A1* | 5/2018 | Yang | G11C 11/5621 |
| 2019/0006001 A1* | 1/2019 | Chun | G06F 11/073 |
| 2019/0042355 A1* | 2/2019 | Ptak | G06F 3/061 |
| 2019/0243578 A1* | 8/2019 | Thompson | G06F 3/0619 |

(Continued)

*Primary Examiner* — Michael Krofcheck
(74) *Attorney, Agent, or Firm* — Patterson + Sheridan, LLP; Steven H. VerSteeg

(57) ABSTRACT

The present disclosure generally relates to data storage devices, such as solid state drives (SSDs), and efficient data storage device operations related to power loss incidents. A controller of the data storage device is configured to periodically pre-encode data that is stored in random access memory (RAM), detect a power loss event, and program the data and parity data to non-volatile memory (NVM) in response to detecting the power loss event. Upon reaching a threshold size, the data in RAM may be pre-encoded and the pre-encoded data can be programmed to the RAM or the NVM. The parity data may be stored in one or more locations of the NVM. Upon detecting a power loss event, any data remaining in RAM that is not pre-encoded is encoded. The data and any parity data not yet programmed to the NVM are programmed to the NVM.

20 Claims, 6 Drawing Sheets

(56) References Cited

U.S. PATENT DOCUMENTS

| | | |
|---|---|---|
| 2019/0324868 A1 | 10/2019 | Shivanna et al. |
| 2019/0361774 A1* | 11/2019 | Pawlowski ........... G06F 3/0673 |
| 2020/0012557 A1* | 1/2020 | Lee ....................... G06F 3/0688 |
| 2020/0089609 A1 | 3/2020 | Colline et al. |
| 2020/0151104 A1 | 5/2020 | Yang |
| 2020/0293396 A1* | 9/2020 | Golov ................. G06F 11/1068 |

* cited by examiner

NVME PERSISTENT MEMORY REGION QUICK COPY

CROSS-REFERENCE TO RELATED APPLICATIONS

This application claims benefit of U.S. provisional patent application Ser. No. 63/141,211, filed Jan. 25, 2021, which is herein incorporated by reference.

BACKGROUND OF THE DISCLOSURE

Field of the Disclosure

Embodiments of the present disclosure generally relate to data storage devices, such as solid state drives (SSDs), and efficient data storage device operations related to power loss incidents.

Description of the Related Art

In many consumer products, the host device does not directly manage memory devices such as NAND dies, rather the host device delegates the responsibility to the data storage device and receives, in return, information of the data storage device. For example, the information received may include flash translation layer (FTL) data, ECC data, wear leveling data, and other relevant data storage device information. Non-volatile memory express (NVMe) version 1.2 introduced a controller memory buffer (CMB) feature and NVMe version 1.4 introduced a persistent memory region (PMR) feature.

Most NVMe data storage devices have a substantial amount of dynamic random access memory (DRAM) in addition to flash memory. The primary purpose of the DRAM is to serve as a cache for the FTL tables that track the mapping between logical block addresses and physical flash memory addresses. The CMB feature allows for some of the DRAM to be directly accessible by the host device. For example, the input/output (IO) command submission and completion queues are located in the data storage device's memory rather than the host device CPU's memory, resulting in decreased latencies. The PMR feature operates similarly to the CMB feature.

However, the PMR feature is a general purpose chunk of memory that is made persistent due to power loss protection capacitors that allow for the data stored in the PMR to be safely flushed to the flash in the event of an unexpected loss of power. When power is restored, the host device may request the data storage device to reload the contents of the PMR from the relevant storage location in the flash. Because the PMR is an additional region to protect against power loss incidents, flushing the content of the PMR to the flash may require extra resources, such as time and/or power.

Thus, what is needed in the art is a more efficient method of protecting data when a power loss incident is detected.

SUMMARY OF THE DISCLOSURE

The present disclosure generally relates to data storage devices, such as solid state drives (SSDs), and efficient data storage device operations related to power loss incidents. A controller of the data storage device is configured to periodically pre-encode data that is stored in random access memory (RAM), detect a power loss event, and program the data and parity data to non-volatile memory (NVM) in response to detecting the power loss event. Upon reaching a threshold size, the data in RAM may be pre-encoded and the pre-encoded data can be programmed to the RAM or the NVM. The parity data may be stored in one or more locations of the NVM. Upon detecting a power loss event, any data remaining in RAM that is not pre-encoded is encoded. The data and any parity data not yet programmed to the NVM are programmed to the NVM.

In one embodiment, a data storage device includes a non-volatile memory and a controller coupled to the non-volatile memory. The controller is configured to pre-encode data stored in RAM to create parity data prior to a power loss incident, detect the power loss incident, and program the data and parity data to the non-volatile memory in response to detecting the power loss incident.

In another embodiment, a data storage device includes a non-volatile memory and a controller coupled to the non-volatile memory. The controller is configured to pre-encode data stored in RAM to create parity data prior to a power loss incident, program the parity data and the data to the non-volatile memory, detect the power loss incident, encode new data stored in the RAM since the programming to create new parity data in response to detecting the power loss incident, and program the new data and the new parity data to the non-volatile memory.

In another embodiment, a data storage device includes memory means, means to pre-encode data to create parity data prior to detecting a power loss incident, means to detect a power loss incident, and means to program data and parity data to the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and efficient data storage device operations related to power loss incidents. A controller of the data storage device is configured to periodically pre-encode data that is stored in random access memory (RAM), detect a power loss event, and program the data and parity data to non-volatile memory (NVM) in response to detecting the power loss event. Upon reaching a threshold size, the data in RAM may be pre-encoded and the pre-encoded data can be programmed to the RAM or the NVM. The parity data may be stored in one or more locations of the NVM. Upon detecting a power loss event, any data remaining in RAM that is not pre-encoded is encoded. The data and any parity data not yet programmed to the NVM are programmed to the NVM.

Figure 1:
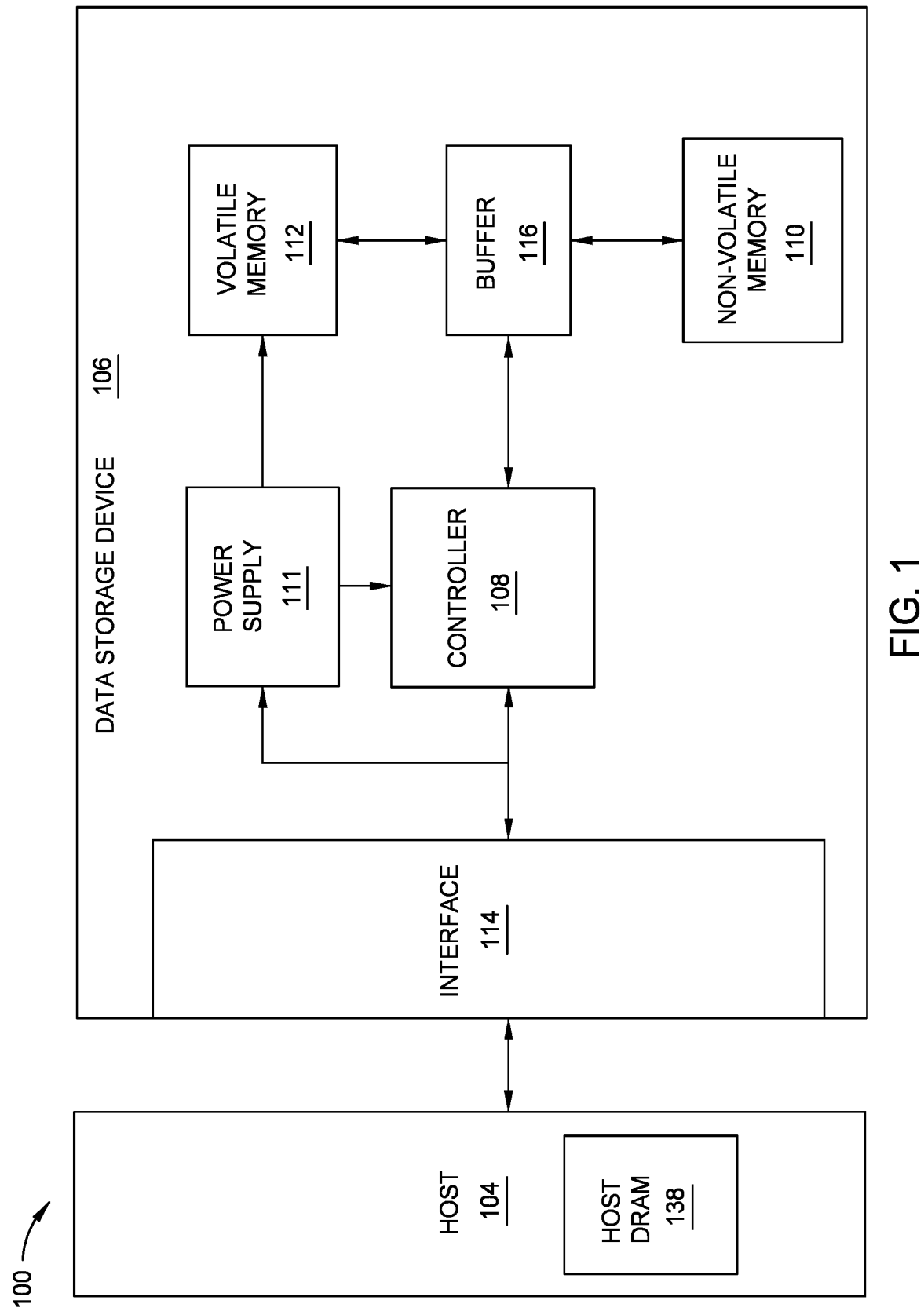
FIG. 1 is a schematic block diagram illustrating a storage system in which data storage device may function as a storage device for a host device, according to certain embodiments.

FIG. 1 is a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). TLC memory, QLC memory, and higher iterations of multi-level cell memories are examples of high capacity memory. The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). In some examples, a portion of the volatile memory 112 may be partitioned as a persistent memory region (PMR) and another portion of the volatile memory 112 may be partitioned as a controller memory buffer (CMB). The host device 104 may interact directly with the PMR and the CMB.

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
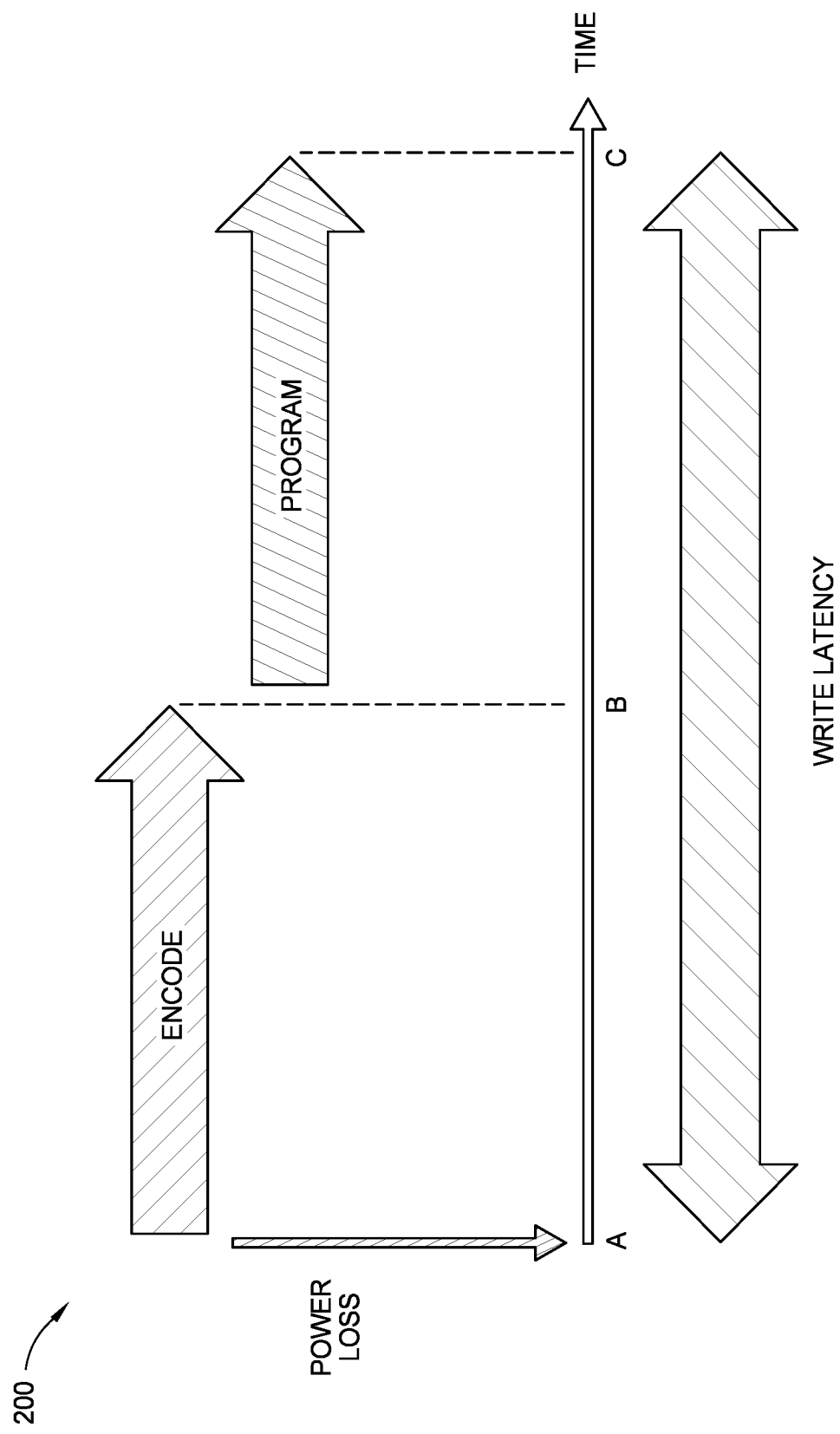
FIG. 2 is a schematic illustration of encoding flow due to detecting a power loss incident, according to certain embodiments.

FIG. 2 is a schematic illustration of encoding flow 200 due to detecting a power loss incident, according to certain embodiments. Aspects of the storage system 100 may be utilized in the description of the flow 200. At time "A", a power loss incident is detected. The power loss incident may be detected by the controller 108 of the data storage device 106 when the power supply 111 is disrupted. After detecting the power loss incident, the data stored in the volatile memory 112 or RAM is encoded at time "A" and programmed to the NVM 110 at time "B". The overall write latency of the flow 200 after a power loss incident is detected at time "A" is the time to encode and program the data stored in the volatile memory 112 or the RAM to the NVM 110 (i.e., the time between time "A" and time "B").

Figure 3:
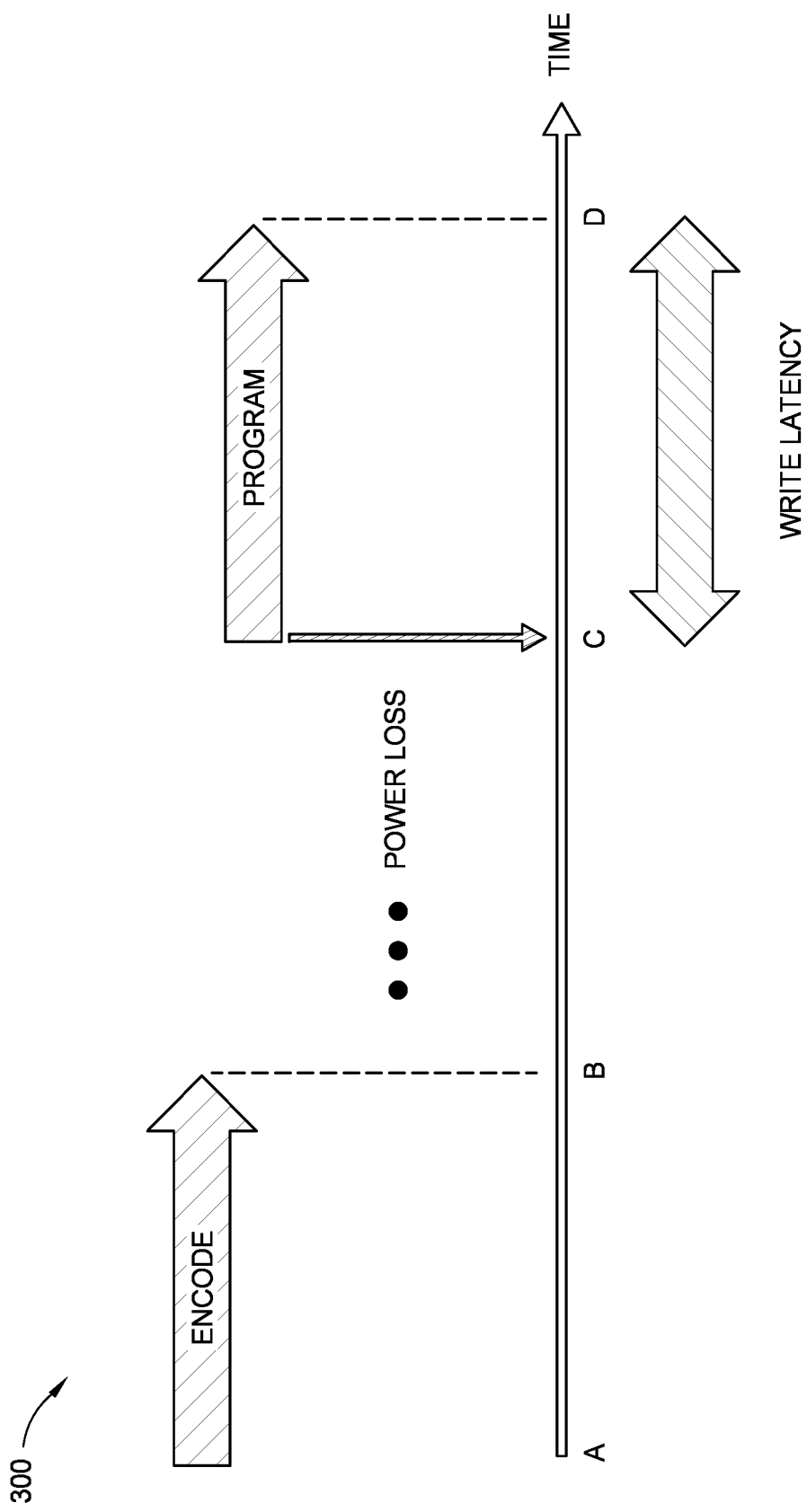
FIG. 3 is a schematic illustration of pre-encoding flow, according to certain embodiments.

FIG. 3 is a schematic illustration of pre-encoding flow 300, according to certain embodiments. Aspects of the storage system 100 may be utilized in the description of the flow 300. In normal operation, the data storage device 106 operates by using power supplied from the host device 104. The internal power supply 111, however, may be used to power the data storage device 106 in the event of power loss from the host device 104. In one embodiment, the power supply 111 is one or more capacitors that store power, initially received from the host device 104. The power supply 111 is used to power the data storage device 106 once power is no longer received from the host device 104. However, the power supply 111 does not generate its own power and hence, the power from power supply 111 will eventually run out. Ideally, the power supply 111 contains sufficient power to power the data storage device 106 for a time sufficient to ensure that all data in volatile memory 112 is flushed to non-volatile memory 110. As discussed with regards to FIGS. 3 and 4, pre-encoding may be beneficial to ensure that as much data from volatile memory 112 is written to non-volatile memory 110 prior to the power from power supply 111 expiring.

When the data is programmed to the data storage device 106, the data may be programmed to the PMR area of the volatile memory 112. At time "A", the data programmed to the PMR area of the volatile memory 112 may be pre-encoded and programmed to a different location of the volatile memory 112, the RAM, or a high capacity memory, such as TLC memory or QLC memory.

Time "A" occurs prior to detecting a power loss incident. At time "B", a power loss incident is detected. Between time "A" and time "B", the data is written to PMR and pre-encoded. At time "C", power received from the host device 104 or other external source is lost and the data storage device 106 utilizes the stored power in power supply 111, (i.e., the internal capacitors) to program or flush the data and the encoded data (i.e., parity data) to the NVM 110. Between time "C" and time "D", the data storage device 106 is powered by power supply 111. The time between time "C"

and time "D" is the amount of time necessary to program data, which is less than the time between "A" and "C" in FIG. 2 because the data has already been pre-encoded between "A" and "B".

From time "C" forward until time "D", the data in the PMR area and the encoded data (i.e., parity data) associated with the data may either be matched and jointly programmed to the NVM 110 or programmed to different locations in the NVM 110. Thus, the overall write latency of the flow 300 after a power loss incident is detected at time "C" and power from the power supply 111 runs out lost at time "D" is the time to program the PMR data and the encoded data to the NVM 110. Hence, the write latency is reduced when compared to the write latency of FIG. 2. When power is restored after time "D", the data that was programmed or flushed to the NVM 110 due to the power loss incident is then copied back to PMR area of the volatile memory 112 or the RAM. The data may be programmed back to the same location of the PMR area, where the same location is the location of the data prior to the power loss incident.

In another embodiment, because the NVM 110 volume is larger than the volume of the volatile memory 112 or the volume of the RAM, data is copied to the SLC memory. When the data is copied to the SLC memory, the amount of expected errors may be very low and weaker data protection codes may be used to protect the data. By copying the data to the SLC memory, there is less parity to copy and shorter codes may be used to protect smaller sections of data. Therefore, small sections of the RAM or the volatile memory 112 may be protected separately. The data and the parity data may each be programmed to the same area or in different areas of the SLC memory.

When specific parts of the RAM or the volatile memory 112 are changed, such as an update of information or data, the respective parity is updated. By protecting smaller sections of the RAM or the volatile memory 112 separately, the chances of changes to the parity data (per codeword (CW)) are lower, and thus, yields a greater coverage of up-to-date parity data and a decrease in time to encode data after a power loss incident is detected. The invalidation process could be either by monitoring the changes in real-time in the RAM or the volatile memory 112 or by a quick check (shorter than encoding) prior to programming the data to the NVM 110 and re-encoding only if necessary.

Figure 4:
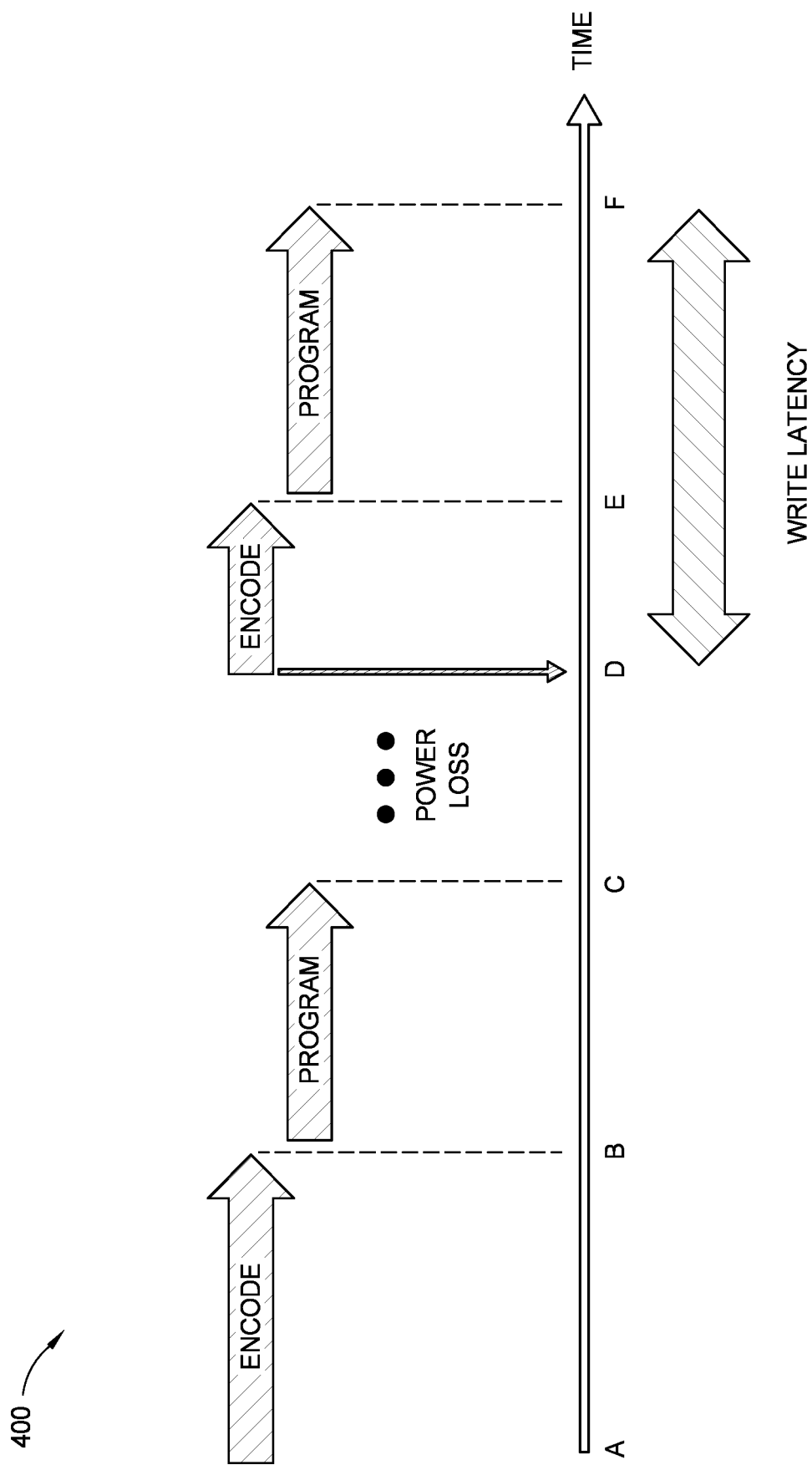
FIG. 4 is a schematic illustration of pre-encoding and pre-programming flow, according to certain embodiments.

FIG. 4 is a schematic illustration of pre-encoding and pre-programming flow 400, according to certain embodiments. Aspects of the storage system 100 may be utilized in the description of the flow 400. If data is to be stored in the PMR area of the volatile memory 112 for greater than a predetermined period of time or a threshold size, then the parity data associated with the data stored in the PMR area of the volatile memory 112 or the RAM may be pre-programmed to the NVM 110. For example, the data stored in the PMR or the RAM is pre-encoded (i.e., before detecting a power loss incident) after a predetermined period of time or exceeding a threshold size and, consequently, pre-programmed (i.e., before detecting a power loss incident) to the NVM 110.

For example, at time "A", the predetermined period of time has elapsed or the threshold size is exceeded. When the predetermined period of time has elapsed or the threshold size is exceeded, the controller 108 pre-encodes the data stored in the PMR or the volatile memory 112. The pre-encoded data is pre-programmed to a high capacity memory, such as TLC memory or QLC memory, of the NVM 110. At time "B", the data associated with the pre-encoded data may also be pre-programmed jointly to the NVM 110, in some embodiments. The time to pre-encode data is the time between "A" and "B". The time to pre-program data is the time between "B" and "C". Hence, compared to FIG. 3, both pre-encoding and programming may occur prior to the power loss incident. The pre-encoding and programming between "A" and "C" may continue until a power loss incident occurs. The controller 108 may be configured to detect a power loss incident, such as the power loss incident at time "D". The power loss incident is due to a loss of power from an external source such as host device 104.

When the power is lost at time "D", the remaining data that is not yet pre-encoded or pre-programmed is encoded between time "D" and time "E" and then programmed to the NVM between time "E" and time "F". The data storage device 106 runs on power from the power supply 111 between time "D" and time "F". At time "F", all of the power from the power supply 111 (e.g., capacitors) has been exhausted. During the time between "D" and "F", the data in the PMR area and the encoded data (i.e., parity data) associated with the data may either be matched and jointly programmed to the NVM 110 or programmed to differently locations in the NVM 110. Thus, the write latency after a power loss incident occurs is between time "D" and time "F". Furthermore, the write latency is reduced when compared to the write latency of FIG. 2. After power is restored to the data storage device 106 at a time after time "F", the data that was programmed or flushed to the NVM 110 due to the power loss incident is then copied back to PMR area of the volatile memory 112 or the RAM. The data may be programmed back to the same location of the PMR area, where the same location is the location of the data prior to the power loss incident.

Because the pre-encoded data (i.e., parity data) is shorter than data and keeping the pre-encoded data in the NAND is not too wasteful, the parity data may be stored in a high capacity memory of the NVM 110, such as TLC memory or QLC memory. Furthermore, when the data stored in the PMR or the RAM is changed, the relevant parity data may be accumulated or constructed upon a power loss event and saved with the host data according to the flow 200 and/or the flow 300. The parity data and the data pre-programmed to the NVM 110 may be in a size greater than the size of the parity data and the data programmed to the NVM 110 following the loss of power after detecting a power loss incident.

Figure 5:
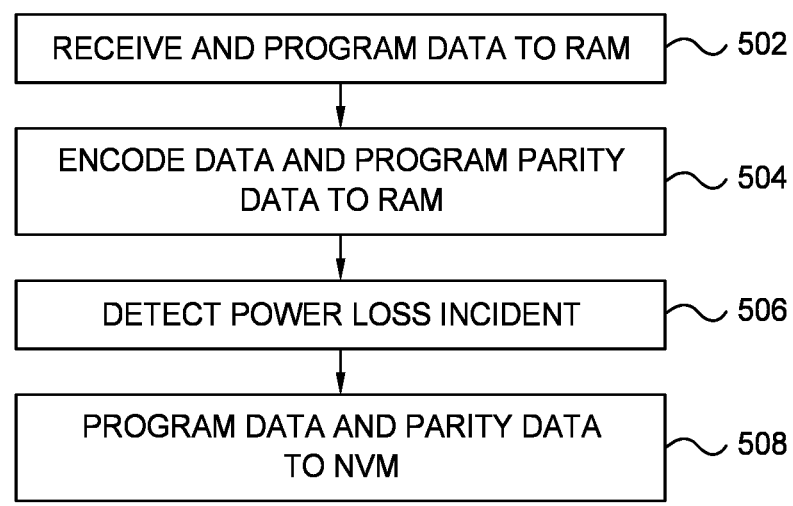
FIG. 5 is a block diagram illustrating a method of pre-encoding, according to certain embodiments.

FIG. 5 is a block diagram illustrating a method 500 of pre-encoding, according to certain embodiments. Aspects of the method 500 may be similar to flow 300 of FIG. 3. At block 502, the data storage device receives and programs data to the RAM or the volatile memory 112. At block 504, the data is encoded and the parity data is programmed to the RAM or the volatile memory 112. At block 506, the controller 108 detects a power loss incident. In the remaining time before the power is completely exhausted, the pre-encoded data, any pre-encoded parity data, any data not pre-encoded, and any parity data corresponding to the not pre-encoded data are programmed to the NVM 110 at block 508.

Figure 6:
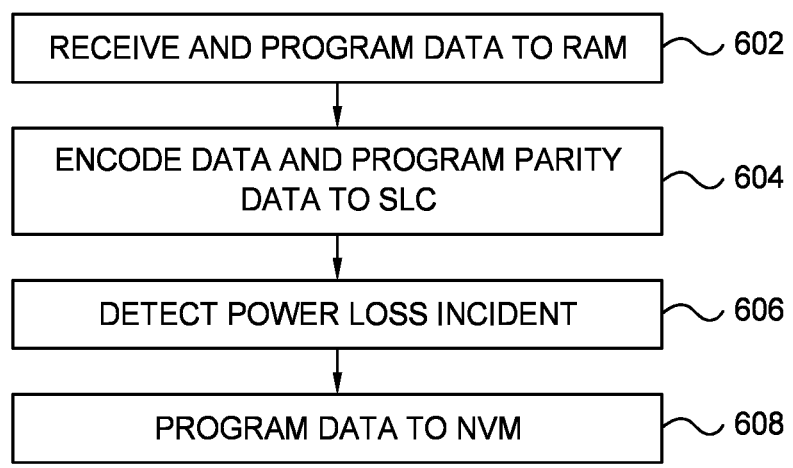
FIG. 6 is a block diagram illustrating a method of periodically pre-encoding, according to certain embodiments.

FIG. 6 is a block diagram illustrating a method 600 of periodically pre-encoding, according to certain embodiments. Aspects of the method 600 may be similar to flow 400 of FIG. 4. At block 602, the data storage device receives and programs data to the RAM, such as the volatile memory 112 of FIG. 1. At block 604, the data is encoded and the parity data is programmed to the SLC. The data may be encoded after a predetermined period of time has elapsed or a threshold size of data has been exceeded. At block 606, the controller 108 detects a power loss incident. In the remaining time before the power is completely exhausted, the pre-encoded data, any pre-encoded parity data, any data not pre-encoded, and any parity data corresponding to the not pre-encoded data are programmed to the NVM 110 at block 608.

Figure 7:
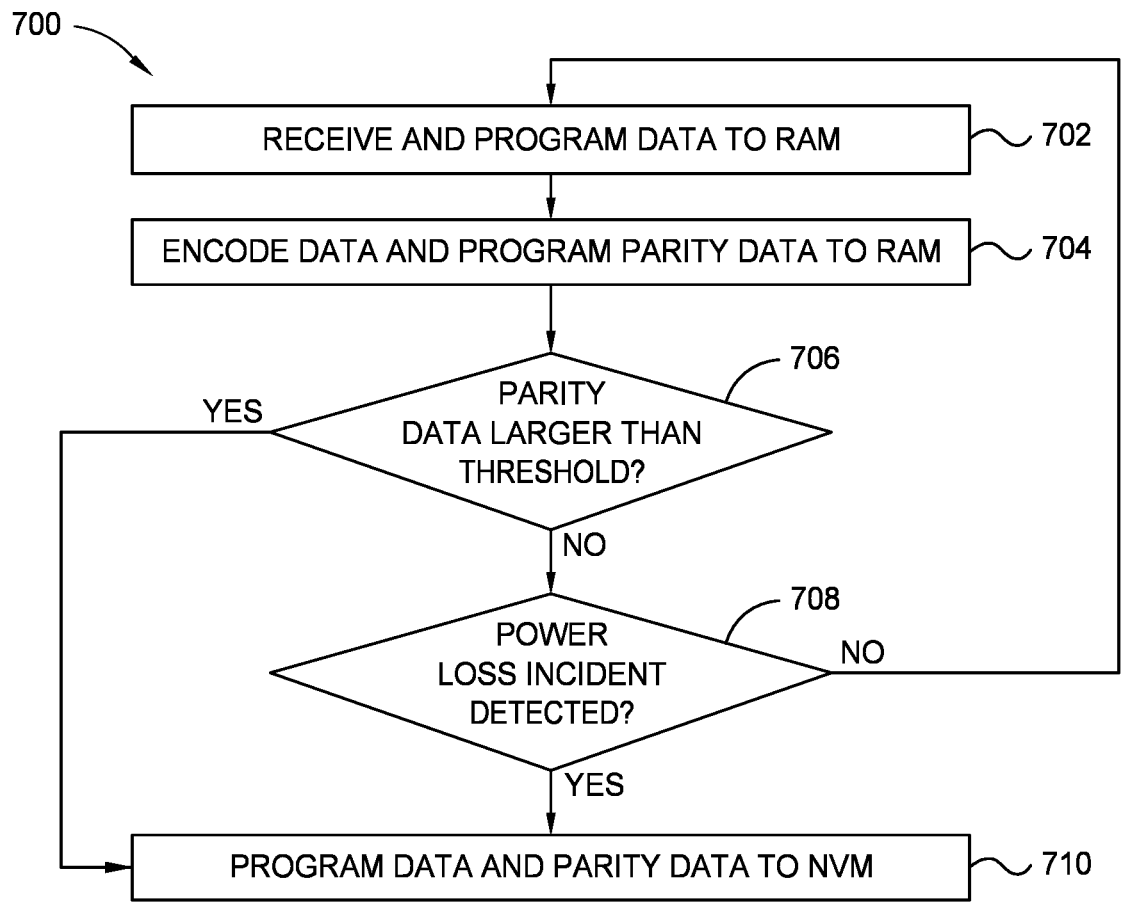
FIG. 7 is a block diagram illustrating a method of pre-programming of parity data, according to certain embodiments.

FIG. 7 is a block diagram illustrating a method 700 of pre-programming of parity data, according to certain embodiments. Aspects of the method 700 may be similar to flow 400. At block 702, the data storage device receives and programs data to the RAM, such as the volatile memory 112 of FIG. 1. At block 704, the data is encoded and the parity data is programmed to the volatile memory 112. At block 706, the controller 108 determines if the parity data not yet programmed to the NVM 110 is larger than a threshold. In some embodiments, the controller 108 determines if the data stored in the volatile memory 112 is larger than a threshold. In other embodiments, the controller 108 determines if the data and the parity data stored in the volatile memory 112 is larger than a threshold.

When the parity data is larger than the threshold at block 706, then at block 710, the parity data and the data associated with the parity are programmed to the NVM 110. If the parity data is not larger than the threshold at block 706, the method 700 advances to block 708, where the controller 108 determines if a power loss incident has been detected. If a power loss incident has not been detected, then the method returns to block 702. However, if the power loss incident is detected at block 708, the method 700 continues to block 710, where the data and parity data are programmed to the NVM 110 in the remaining time before the power is completely exhausted (i.e., the internal capacitors run out of stored power). For example, any data and any parity data not yet programmed to the NVM 110 are programmed to the NVM 110. The not yet programmed parity data is in a smaller size than the threshold.

Figure 8:
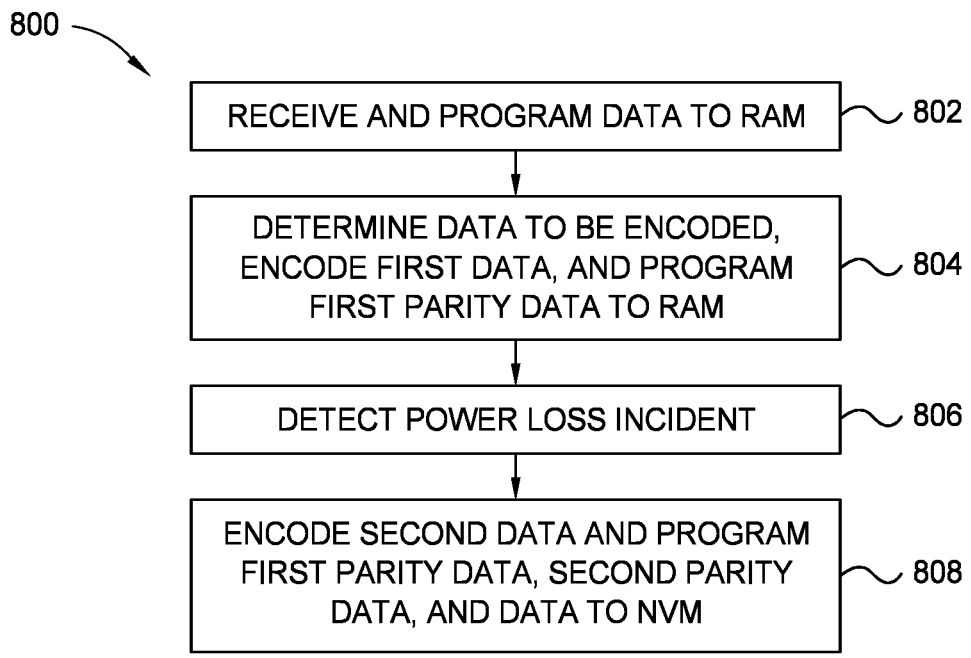
FIG. 8 is a block diagram illustrating a method of pre-encoding and pre-programming, according to certain embodiments.

FIG. 8 is a block diagram illustrating a method 800 of pre-encoding and pre-programming, according to certain embodiments. Aspects of the method 800 may be similar to flow 400. At block 802, the data storage device receives and programs data to the RAM, such as the volatile memory 112 of FIG. 1. At block 804, the controller 108 determines which data of the received data is to be encoded. For example, the data may be parsed to determine which data is more likely to be needed, such as by using either a simple matrix (e.g. the data type, the time the data resides in the system, and the like) or utilizing more complex models based on machine learning (ML) techniques. Furthermore, at block 804, the first data is encoded and programmed to the volatile memory 112. The first data is less than all of the received data.

At block 806, the controller 108 detects a power loss incident. In the remaining time before the power is completely exhausted, at block 808, the second data (i.e., the remaining data of the received data) is encoded. The first parity data, the second parity data, and the data are programmed to the NVM 110 at block 808. Furthermore, it is to be understood that the first data may be programmed to the NVM 110 utilizing the flow 300 and/or the flow 400.

By implementing a more agile, shortened encoding and programming scheme, with respect to detecting power loss incidents, implementation of PMR on devices not supporting PMR may be enabled, the size of the supported PMR may be increased, and the size of the required power loss protection capacitors may be decreased.

In one embodiment, a data storage device includes a non-volatile memory and a controller coupled to the non-volatile memory. The controller is configured to pre-encode data stored in RAM to create parity data prior to a power loss incident, detect the power loss incident, and program the data and parity data to the non-volatile memory in response to detecting the power loss incident.

The parity data is stored in a different location in the RAM from the data. The programming includes writing the data and the parity data to different locations of the non-volatile memory. The programming includes jointly writing the parity data and the data to the non-volatile memory. The pre-encoding occurs periodically. The controller is further configured to monitor changes in the data in the RAM. The controller is further configured to check the data prior to programming the data and the parity data to the non-volatile memory. The pre-encoding occurs to a first section of the data prior to a second section of the data stored in the RAM. The programming the parity data and the data to the non-volatile memory comprises programming to SLC memory. The pre-encoded data is less than all the data.

In another embodiment, a data storage device includes a non-volatile memory and a controller coupled to the non-volatile memory. The controller is configured to pre-encode data stored in RAM to create parity data prior to a power loss incident, program the parity data and the data to the non-volatile memory, detect the power loss incident, encode new data stored in the RAM since the programming to create new parity data in response to detecting the power loss incident, and program the new data and the new parity data to the non-volatile memory.

The parity data is programmed to a high capacity memory. The high capacity memory includes TLC memory and QLC memory. The data, the new data, and the new parity data are programmed to SLC. The pre-encoding occurs to less than all available data. A first size of the parity data is greater than a second size of the new parity data. The new parity data includes data changes since programming the parity data.

In another embodiment, a data storage device includes memory means, means to pre-encode data to create parity data prior to detecting a power loss incident, means to detect a power loss incident, and means to program data and parity data to the memory means.

The data storage device further includes means to selectively determine which data to pre-encode. The means to program is further configured to store data and parity data in different locations of the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a non-volatile memory; and
 a controller coupled to the non-volatile memory, wherein the controller is configured to:
  determine whether changes in random access memory (RAM) exceeds a first threshold, wherein the first threshold corresponds to a time since last pre-encoding data;
  pre-encode data stored in the RAM to create parity data prior to a power loss incident, wherein the pre-encoding occurs in response to the determining;
  determine that the parity data stored in the RAM is greater than a second threshold, wherein the data and the parity data is not yet programmed to the non-volatile memory, wherein the first threshold and the second threshold are distinct;

program the data associated with the parity data and the parity data stored in the RAM to the non-volatile memory when the parity data stored in the RAM is greater than the second threshold value;

detect the power loss incident; and program only data, not yet programmed to the non-volatile memory, and only parity data, not yet programmed to the non-volatile memory, to the non-volatile memory in response to detecting the power loss incident.

2. The data storage device of claim 1, wherein the parity data is stored in a different location in the RAM from the data.

3. The data storage device of claim 1, wherein the programming comprises writing the data and the parity data to different locations of the non-volatile memory.

4. The data storage device of claim 1, wherein the programming comprises jointly writing the parity data and the data to the non-volatile memory.

5. The data storage device of claim 1, wherein the pre-encoding occurs periodically.

6. The data storage device of claim 1, wherein the controller is further configured to monitor changes in the data in the RAM.

7. The data storage device of claim 1, wherein the controller is further configured to check the data prior to programming the data and the parity data to the non-volatile memory.

8. The data storage device of claim 1, wherein the pre-encoding occurs to a first section of the data prior to a second section of the data stored in the RAM.

9. The data storage device of claim 1, wherein the programming the parity data and the data to the non-volatile memory comprises programming to single level cell (SLC) memory.

10. The data storage device of claim 1, wherein the parity data is less than the data.

11. A data storage device, comprising:

a non-volatile memory; and a controller coupled to the non-volatile memory, wherein the controller is configured to:

determine whether changes in random access memory (RAM) exceeds a first threshold, wherein the first threshold corresponds to a time since last pre-encoding data;

pre-encode data stored in the RAM to create parity data prior to a power loss incident, wherein the pre-encoding occurs in response to the determining;

determine that the parity data stored in the RAM is greater than a second threshold, wherein the data and the parity data is not yet programmed to the non-volatile memory, wherein the first threshold and the second threshold are distinct;

program the parity data and the data to the non-volatile memory when the parity data stored in the RAM is greater than the second threshold;

detect the power loss incident;

encode new data stored in the RAM since the programming to create new parity data in response to detecting the power loss incident; and program the new data, not yet programmed to the non-volatile memory, and the new parity data, not yet programmed to the non-volatile memory, to the non-volatile memory.

12. The data storage device of claim 11, wherein the parity data is programmed to a high capacity memory, and wherein the high capacity memory comprises triple level cell (TLC) memory and quad level cell (QLC) memory.

13. The data storage device of claim 12, wherein the data, the new data, and the new parity data are programmed to SLC.

14. The data storage device of claim 11, wherein the pre-encoding occurs to less than all available data.

15. The data storage device of claim 11, wherein a first size of the parity data is greater than a second size of the new parity data.

16. The data storage device of claim 11, wherein the new parity data comprises data changes since programming the parity data.

17. The data storage device of claim 11, wherein the controller is further configured to:

determine whether changes in the RAM have exceeded the first threshold; and upon exceeding the first threshold, pre-encode a new version of the parity data prior to the power loss incident.

18. A data storage device, comprising:

memory means;

means to determine whether changes in random access memory (RAM) exceeds a first threshold, wherein the first threshold corresponds to a time since last pre-encoding data;

means to pre-encode data to create parity data prior to detecting a power loss incident, wherein the pre-encoding occurs in response to the determining;

means to determine that the parity data stored in the RAM is greater than a second threshold, wherein the data and the parity data is not yet programmed to the memory means, wherein the first threshold and the second threshold are distinct;

means to program the data associated with the parity data and the parity data stored in the RAM to the memory means when the parity data stored in the RAM is greater than the second threshold;

means to detect a power loss incident; and means to program only data, not yet programmed to the memory means, and only parity data, not yet programmed to the memory means, to the memory means.

19. The data storage device of claim 18, further comprising means to selectively determine which data to pre-encode.

20. The data storage device of claim 18, wherein the means to program is further configured to store data and parity data in different locations of the memory means.

* * * * *